Aug. 11, 1925. 1,549,339
E. J. VAN BALKOM
LUBRICATING SYSTEM FOR INTERNAL COMBUSTION ENGINES
Filed April 13, 1922 3 Sheets-Sheet 3
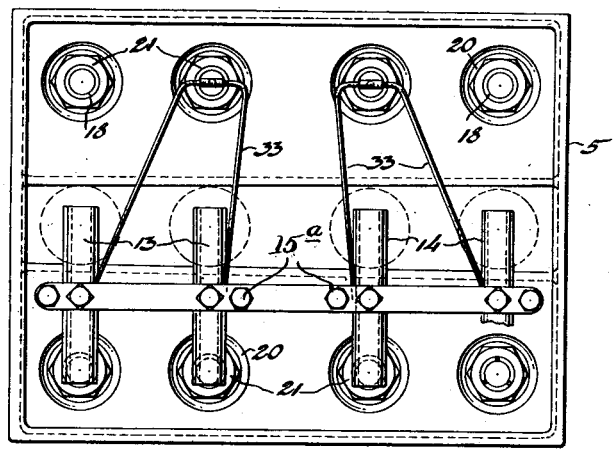
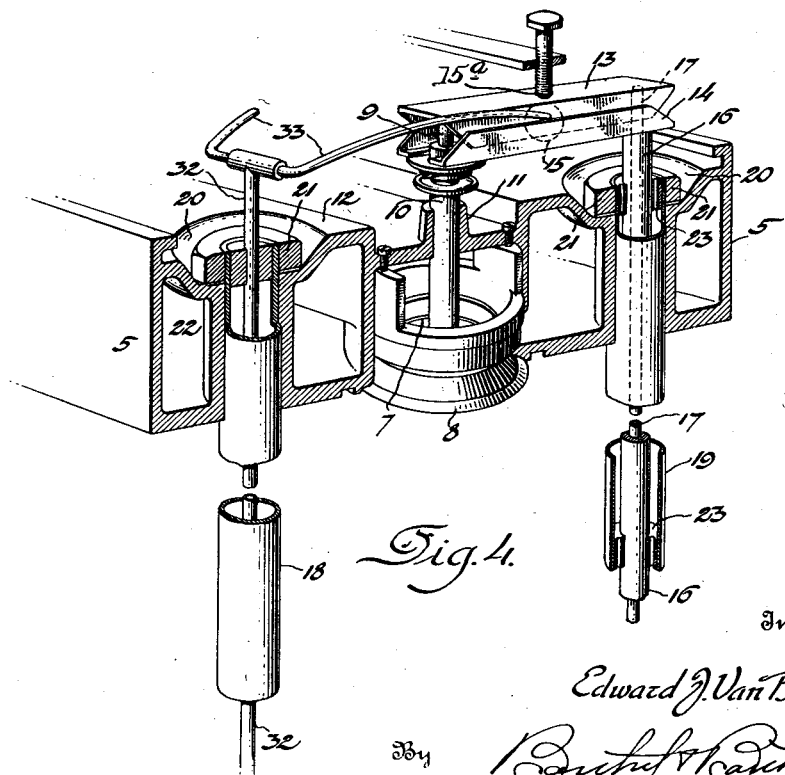
Inventor:
Edward J. Van Balkom
By
Attorneys Patented Aug. 11, 1925.

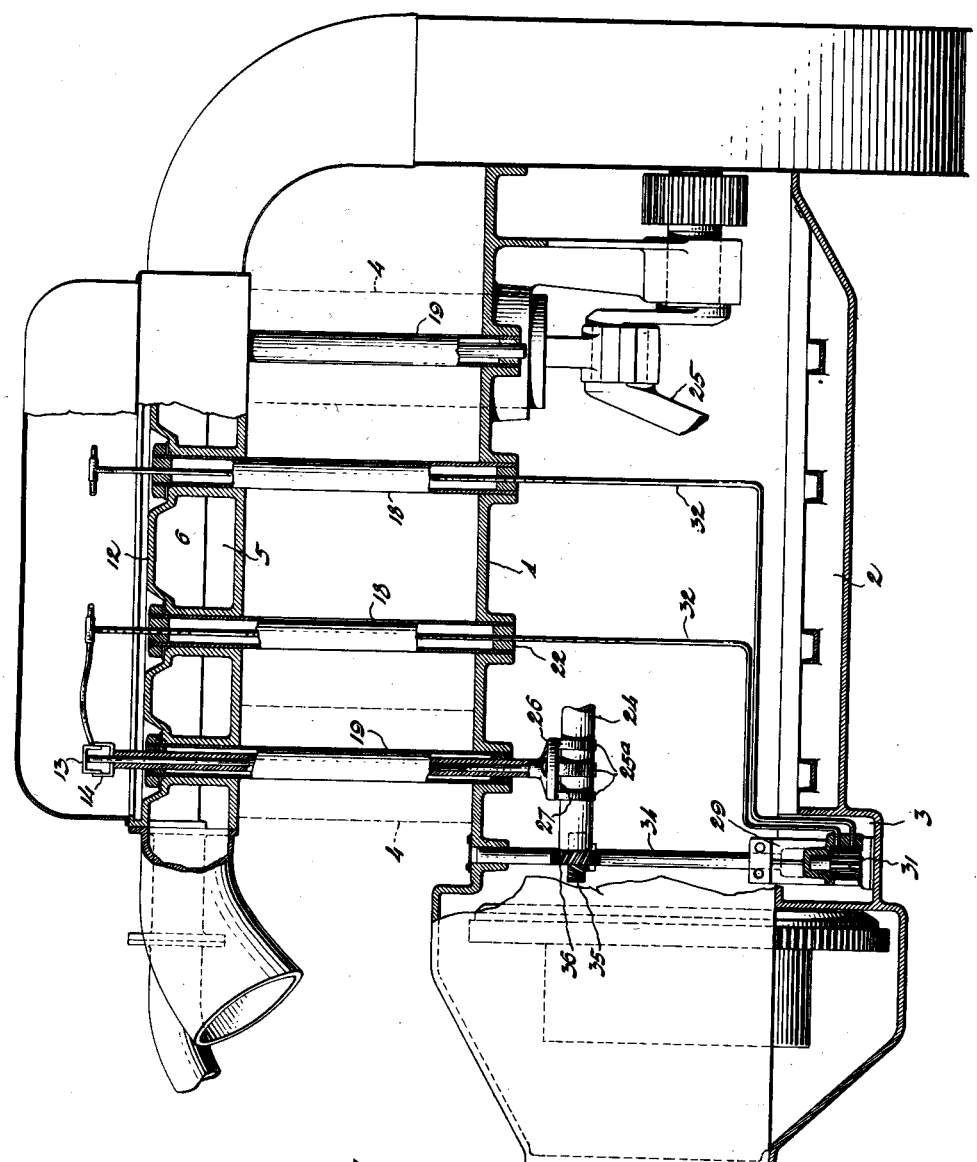

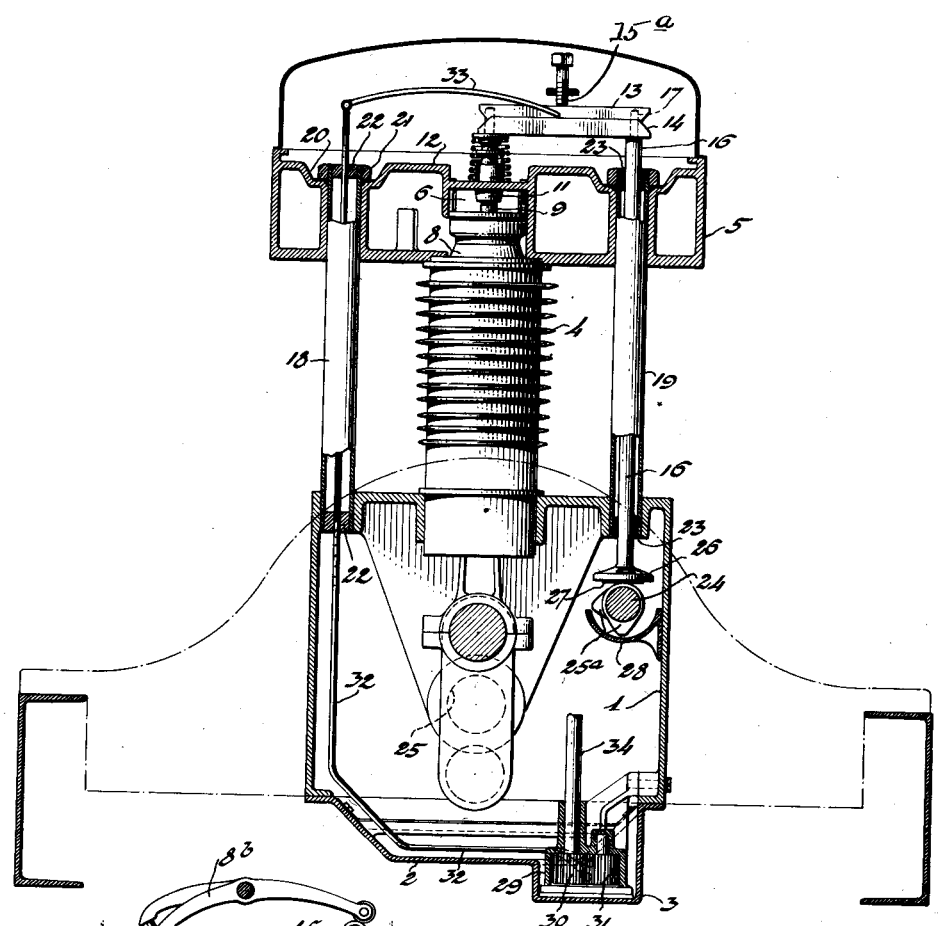

1,549,339

UNITED STATES PATENT OFFICE.

EDWARD J. VAN BALKOM, OF FERNDALE, MICHIGAN, ASSIGNOR TO HAROLD H. SMILANSKY, OF DETROIT, MICHIGAN.

LUBRICATING SYSTEM FOR INTERNAL-COMBUSTION ENGINES.

Application filed April 13, 1922. Serial No. 552,287.

*To all whom it may concern:*

Be it known that I, EDWARD J. VAN BALKOM, a subject of the Queen of Holland, residing at Ferndale, in the county of Oakland and State of Michigan, have invented certain new and useful Improvements in Lubricating Systems for Internal-Combustion Engines, of which the following is a specification, reference being had therein to the accompanying drawings.

In my companion application, filed under even date, there is disclosed an internal combustion engine including a crank case, cylinders, pistons reciprocable in said cylinders and adapted to drive a crank shaft journaled in said crank case, a housing on said cylinders affording an intake manifold and an exhaust manifold, intake and exhaust valves for said cylinders with said valves provided with valve rods one sliding in the other, sets of casings connecting said housing to said crank case, rocker members in said housing adapted to actuate said valve rods, inner and outer tappet rods in one set of casings adapted to actuate said rocker members, and a cam shaft and cams in said crank case adapted to actuate said inner and outer tappet rods.

The valve rods, rocker members, tappet rods and cams require lubrication and this invention aims to provide novel means for distributing lubricant to those parts that require lubrication. The lubricating means includes a pump within the crank case driven from the crank shaft therein, and tubes or conduits extending through some of the casings, connecting the crank case and the housing, for distributing lubricant to the rocker members, which lubricant due to the shape of said rocker members finds its way to the valve rods and tappet rods. The casings through which the tappet rods extend are constructively arranged to afford conduits which will distribute lubricant at the cams of the cam shaft, and the pump provides a force feed lubricant system that may also be utilized for distributing lubricant to other parts of the engine.

The construction entering into the lubricating system of my internal combustion engine will be hereinafter described and then claimed, and reference will now be had to the drawings, wherein Figure 1 is a side elevation of the engine, partly broken away and partly in section, showing a lubricant pump and lubricant distributing tubes or conduit;

Fig. 2 is a cross sectional view of the same;

Fig. 3 is a plan of a housing of the engine showing the rocker members and lubricant distributing tubes or conduits leading thereto;

Fig. 4 is a perspective view, partly in section, showing the valve operating mechanism adapted to be lubricated in accordance with my invention, and Fig. 5 is a vertical sectional view of a modified form of engine.

In the drawings the reference numeral 1 denotes a crank case having a basin 2 provided with a well or sump 3 and on the crank case are cylinders 4 supporting a housing 5 which serves as an exhaust manifold and contains an intake manifold 6. These manifolds are adapted to communicate with the cylinders 4 through the medium of intake and exhaust valves 7 and 8 respectively having valve rods 9 and 10, the rod 9 sliding in the rod 10 and the rod 10 sliding in a guide or boss 11 carried by the upper wall 12 of the housing 5. The valve rods are adapted to be depressed to open the intake and exhaust valve and this is accomplished by channel shaped superposed fulcrumed rocker members 13 and 14 with a fulcrum member 15 between said rocker members so that said members may fulcrum on each other. One end of the rocker member 14 is supported from the valve rod 10 and the opposite end of said rocker member is supported on an outer tappet rod 16. One end of the rocker member 13 engages the valve rod 9 and the opposite end of the rocker member engages an inner tappet rod 17 slidable in the outer tappet rod 16. Bearing on the upper rocker members 13, in vertical alinement with the fulcrum members 15, are screw fulcrum members 15ª suitably supported above the rocker members. These screw fulcrum members 15ª maintain the upper rocker members 13 on the fulcrum members 15 so that the lower rocker members 14 may be rocked relative to the fulcrum members 15, and the screw fulcrum members 15ª serve the same purpose for the upper rocker members. The fulcrum members 15 are housed between the channel rocker members 13 and 14 and with sufficient pressure of the screw fulcrum members on the upper rocker members 13, the fulcrum members 15 will not shift longitudinally of said rocker members.

Connecting the housing 5 and the crank case 1 are sets of tubular supports or casings 18 and 19, said casings having the lower ends thereof mounted in the crank case 1 and the upper ends thereof extending through the housing 5 into wells or depressed portions 20 at the top wall 12 of the housing 5, where the upper ends of said casings may be held by nuts 21 or other fastening means.

In the upper and lower ends of the casings 18 are spacers 22 and in the upper and lower ends of the casings 19 are apertured or ported spacers 23, said spacers providing guides for the outer tappet rod 16 and permitting of lubricant flowing through the casings 19.

In the crank case 1 is a cam shaft 24 adapted to be driven from a crank shaft 25 journaled in said crank case and driven by pistons within the cylinders 4. On the cam shaft 24 are cams 25ª adapted to engage inner and outer tappet heads 26 and 27, carried by the inner and outer tappet rods 17 and 16 respectively. The outer tappet heads 26 are apertured or of a spider formation so that lubricant from the lower ends of the casings 19 may be deposited on the outer tappet heads 26 and passed through said heads to the cams. Below the cams 25ª is a catch basin or trough 28 which receives the lubricant from the casings 19 and as the cam shaft is driven the cams 25ª thereof will be swung into and out of the lubricant within the catch basin or trough.

In the well or sump 3 of the crank case basin 2 is a lubricant pump of a conventional form, preferably that type which includes a casing 29 containing rotary interengaging or meshing lubricant feeding members 30 and 31, as gear wheels which force lubricant from one side of the casing 29 to the opposite side thereof where the lubricant is caused to enter tubes or conduits 32 extending out of the well or sump 3, through the crank case 1 and through the spacers 22 in two of the casings 18.

The upper ends of the tubes or conduits 32 have branches 33, best shown in Fig. 3, extending to the upper rocker members 13 to supply lubricant to said rocker members in proximity to the fulcrum members 15 therein.

One of the lubricant feeding members 30 is driven by a vertically disposed shaft 34 extending upwardly in the crank case 1 and provided with a worm 35 meshing with a worm wheel 36 on the cam shaft 24.

With the engine in operation the well or sump 3 receives lubricant from any source of supply and such lubricant as may drain from the basin 2 and the trough 28, and the lubricant will be forced through the tubes or conduits 32 to the rocker members 13 and 14. The conduits 32 discharged against the side walls of the upper rocker members 13 and the lubricant will enter the lower rocker members 14 adjacent the fulcrum members 15, consequently the fulcrum members will bear on the lubricant wetted bottom walls of the lower rocker members. The channel shape of the rocker member 14 will cause lubricant to be distributed to the inner and outer valve rods 9 and 10 and the inner and outer tappet rods 17 and 16. Some of the lubricant will find its way through the casings 19 to the cam shaft 24 and all of the movable parts of the valve operating mechanism will be thoroughly lubricated.

My lubricating system has been applied to an engine wherein the housing 5 is supported by the cylinders 4 and the casings 18 and 19 with the intake and exhaust valves in the vertical axes of the cylinders. In Fig. 5 I show an engine including a housing 5ª which is supported by casing walls 5ᵇ to the crank case 5ᶜ of the engine and extending into the crank case are cylinders 4ª which have the upper ends thereof connected to the housing 5ª, so that said cylinders will be virtually suspended from the housing. Instead of the intake and exhaust valves 8ª being in the axes of the cylinders 4ª, said valves are disposed at an angle by providing a combustion chamber 4ᵇ at the upper end of each cylinder. It is then possible to place the spark plugs in walls of the combustion chambers 4ᵇ and still use the greater part of the housing 5ª as an exhaust manifold. In this instance a cam shaft 4ᶜ may be located above the housing 5ª to actuate rocker members 8ᵇ which in turn operate the intake and exhaust valves.

What I claim is:—

1. In a lubricating system for an internal combustion engine wherein a cam shaft actuates tappet rods which in turn actuate rocker members adapted to operate intake and exhaust valves of the internal combustion engine, and a housing for said valves and rocker members spaced from the crank case of the internal combustion engine and connected thereto by side rows of tubular casings through one row of which said tappet rods extend:—means for supplying lubricant to said rocker members, said means including a pump in the crank case of said internal combustion engine and conduits extending from said pump through the other row of said casings and having branches extending to said rocker members, said rocker members having a configuration causing lubricant to be distributed to said tappet rods and valves.

2. Lubricating means as in claim 1, wherein said rocker members are channel shaped, one inverted in the other, and one rocker member causing lubricant to be distributed alternately to said tappet rods and said valves, and a trough below said cam shaft receives such lubricant to be gathered by said cams.

3. In an internal combustion engine having intake and exhaust valve rods adapted to be actuated by tappet rods:—upper and lower channel rocker members adapted to cause such actuation, a fulcrum member housed between said rocker members, and a lubricant supply conduit adapted to supply lubricant to the fulcrum member between said rocker members, so that the lower channel rocker member may alternately deliver lubricant to said valve rods and to said tappet rods.

In testimony whereof I affix my signature in presence of two witnesses.

EDWARD J. VAN BALKOM.

Witnesses:
A. TOLCHAN,
K. H. BUTLER.